US008891905B2

(12) United States Patent
Cui

(10) Patent No.: US 8,891,905 B2
(45) Date of Patent: Nov. 18, 2014

(54) BOUNDARY-BASED HIGH RESOLUTION DEPTH MAPPING

(71) Applicant: Hong Kong Applied Science and Technology Research Institute Co., Ltd., Shatin (HK)

(72) Inventor: Chunhui Cui, Fanling (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 56 days.

(21) Appl. No.: 13/720,161

(22) Filed: Dec. 19, 2012

(65) Prior Publication Data

US 2014/0169701 A1  Jun. 19, 2014

(51) Int. Cl.
*G06K 9/32* (2006.01)
*G06T 3/40* (2006.01)
*G06K 9/00* (2006.01)

(52) U.S. Cl.
CPC .................................. *G06T 3/4053* (2013.01)
USPC ....................................................... 382/299

(58) Field of Classification Search
CPC ............. G06T 2207/00; G06T 3/4007; H04N 1/40068
USPC .......... 382/181, 199, 254, 299, 300; 348/443, 348/458, 581; 375/240.16; 345/419
See application file for complete search history.

(56) References Cited

U.S. PATENT DOCUMENTS

| 7,889,949 | B2 | 2/2011 | Cohen et al. | |
|---|---|---|---|---|
| 7,956,930 | B2* | 6/2011 | Sullivan | 348/581 |
| 7,974,498 | B2* | 7/2011 | Ben-Ezra et al. | 382/299 |
| 8,149,235 | B2* | 4/2012 | Aguera Y Arcas | 345/419 |
| 8,655,109 | B2* | 2/2014 | Lin et al. | 382/299 |
| 2008/0131028 | A1* | 6/2008 | Pillman et al. | 382/299 |

FOREIGN PATENT DOCUMENTS

| CN | 101969564 A | 2/2011 |
|---|---|---|
| EP | 2369850 A2 | 9/2011 |
| EP | 2466901 A2 | 6/2012 |
| KR | 20110016896 A | 2/2011 |

OTHER PUBLICATIONS

Diebel et al., "An Application of Markov Random Fields to Range Sensing," NIPS, 2005, 8 pages.
Q. Yang et al., "Spatial-Depth Super Resolution for Range Images", CVPR, 2007, 8 pages.
J. Zhu et al., "Fusion of Time-of-Flight Depth and Stereo for High Accuracy Depth Maps", CVPR, 2008, 8 pages.

(Continued)

*Primary Examiner* — Amir Alavi
(74) *Attorney, Agent, or Firm* — Fulbright & Jaworski LLP

(57) ABSTRACT

Systems and methods which provide generation of high resolution depth maps from low resolution depth information using boundary-based processing techniques are disclosed. Boundary-based depth processing provided by embodiments implements boundary detection and boundary-based interpolation algorithms for providing high resolution depth information from low resolution depth information and high resolution image information. Boundary detection algorithms are implemented according to embodiments to detect object boundaries (e.g., depth discontinuities), where the low resolution depth samples are typically inaccurate and generally in need of refining. Boundary-based interpolation algorithms are implemented according to embodiments of the invention to refine intermediate upsampled depth information (e.g., spatially interpolated low resolution depth information), using the boundary information provided by a boundary detection algorithm, and provide high resolution depth information.

29 Claims, 7 Drawing Sheets

(56) References Cited

OTHER PUBLICATIONS

D. Chan et al., "A Noise-Aware Filter for Real-Time Depth Upsampling", Workshop on Multi-camera and Muti-modal Sensor Fusion (M2SFA2), 2008, 12 pages.

S. Schuon et al., "LidarBoost: Depth Superresolution for ToF 3D Shape Scanning", CVPR, 2009, 8 pages.

E. Lee et al., "Generation of High-Quality Depth Mapes Using Hybrid Camera System for 3-D video," J. Vis. Commun. Image R., 2010, 12 pages.

* cited by examiner

BOUNDARY-BASED HIGH RESOLUTION DEPTH MAPPING

TECHNICAL FIELD

The invention relates generally to three-dimensional image processing and, more particularly, to generation of high resolution depth maps using boundary-based processing techniques.

BACKGROUND OF THE INVENTION

In three-dimensional (3D) image processing (e.g., 3D computer graphics, 3D modeling, 3D motion picture generation, etc.) information regarding object depth from a viewpoint is often used. For example, a depth map (e.g., an image or image channel) containing information relating to the distance of the surfaces of scene objects from a viewpoint may be used in providing depth information in association with a two-dimensional (2D) image.

Unfortunately, capturing or otherwise obtaining high resolution depth information is often difficult. For example, although cameras operable to capture high resolution 2D images (referred to herein as image cameras) are quite common (e.g., so common as to be included in many consumer devices, such as cellular phones, tablet devices, and notebook computers) and relatively inexpensive, the proliferation of cameras operable to capture depth information for a scene (referred to herein as depth cameras) are considerably less common and relatively expensive. Such depth cameras generally provide low resolution depth information, and thus may not map accurately to a corresponding high resolution image.

Although various techniques for providing upsampling or interpolation of low resolution depth information to higher resolution depth information have been tried, the techniques have not been wholly satisfactory. For example, the prior art interpolation techniques apply interpolative algorithms that examine depth samples which include unreliable samples, thereby tainting the interpolated results with unreliable sample inputs. The prior art interpolation techniques additionally cannot accurately identify depth discontinuities, and thus result in blurred and inaccurate object boundaries in the generated depth map. Moreover, the prior art interpolation techniques tend to require significant processing, such as due to performing bilateral filtering or interpolation for each pixel, implementing relatively large interpolation sample window sizes, etc. Accordingly, the resulting upsampled depth maps are often inaccurate at the cost of considerable processing resources.

BRIEF SUMMARY OF THE INVENTION

The present invention is directed to systems and methods which provide generation of high resolution depth maps from low resolution depth information using boundary-based processing techniques. Boundary-based depth processing provided by embodiments of the invention implements boundary detection and boundary-based interpolation algorithms for providing high resolution depth information from low resolution depth information and high resolution image information. Boundary detection algorithms are implemented according to embodiments of the invention to detect object boundaries (e.g., depth discontinuities), where the low resolution depth samples are typically inaccurate and generally in need of refining based on high resolution image information. Boundary-based interpolation algorithms are implemented according to embodiments of the invention to refine intermediate upsampled depth information (e.g., spatially interpolated low resolution depth information), using the boundary information provided by a boundary detection algorithm, and thus provide more accurate and reliable high resolution depth information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
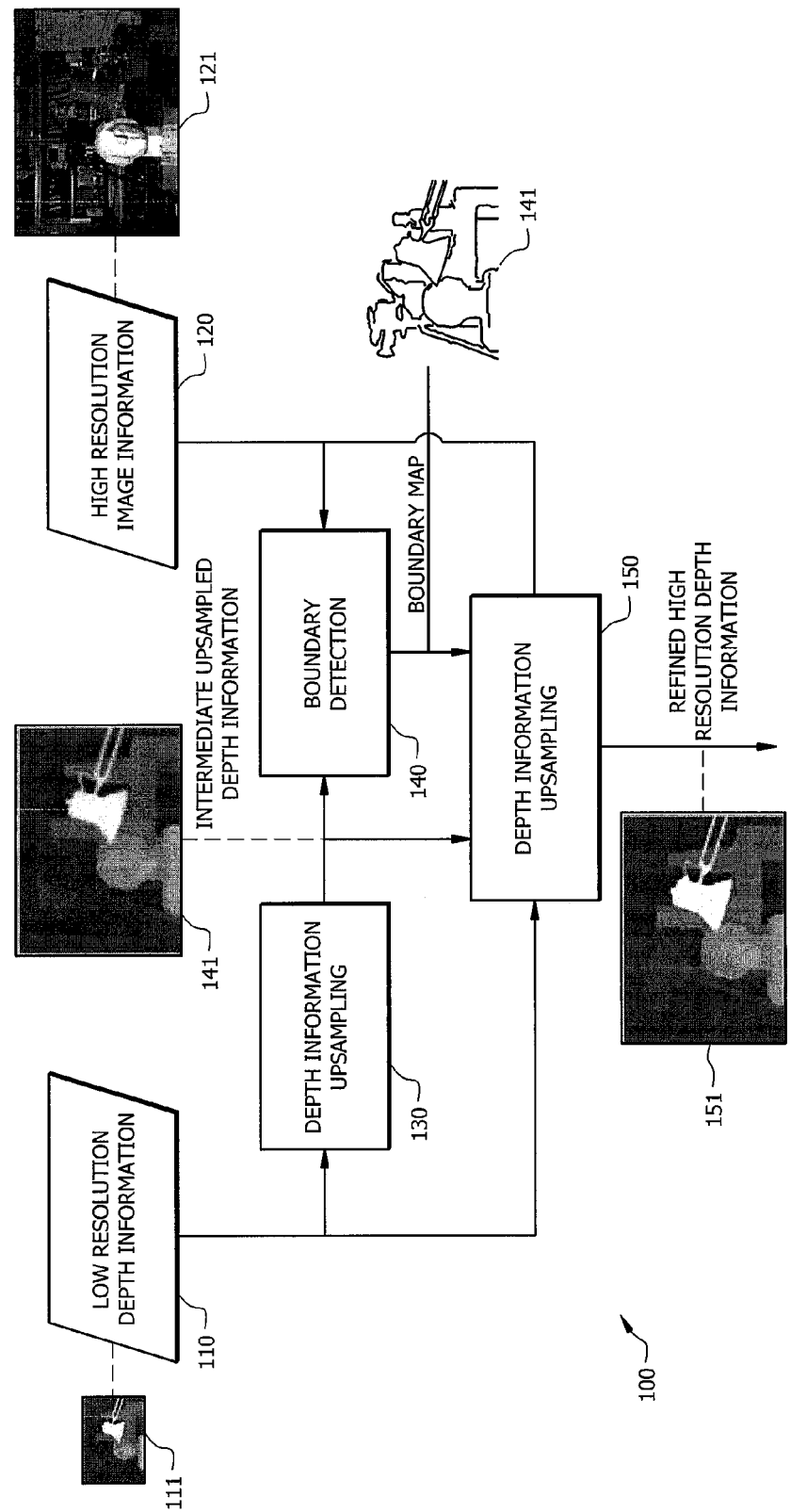
FIG. 1 shows a high level functional block diagram of a system adapted to provide boundary-based depth processing according to embodiments of the present invention.

FIG. 1 shows a high level functional block diagram of a system adapted to provide boundary-based depth processing according to embodiments of the present invention. In operation, system 100 of the illustrated embodiment generates high resolution (e.g., ≥1024×768 pixels) depth information 151 from low resolution (e.g., ≤600×400 pixels) depth information 110 (e.g., provided by low resolution depth map 111, as may be captured by a depth camera) and high resolution image information 120 (e.g., provided by high resolution image 121, as may be captured by an image camera) using boundary-based processing techniques according to the concepts herein.

Boundary-based depth processing provided by system 100 of the illustrated embodiment implements intermediate upsampling of the depth information, boundary detection, and boundary-based interpolation for providing high resolution depth information from low resolution depth information and high resolution image information. Accordingly, system 100 is shown to include depth information upsampling logic 130, boundary detection logic 140, and boundary-based interpolation logic 150 interconnected to provide boundary-based depth processing herein.

It should be appreciated that the foregoing logic may be implemented in various ways, including hardware logic circuits, software, firmware, and combinations thereof. When implemented in software, elements of embodiments of the present invention may comprise code segments operable upon a processor-based system, such as computer system 200 of FIG. 2, to perform the tasks described herein. The code segments can be stored in a computer readable medium, such as random access memory (RAM) 203, read only memory (ROM) 204, and/or storage device 206. Additionally or alternatively, the code segments may be downloaded via computer networks, such as network 212.

Computer system 200 adapted for use according to an embodiment of the present invention may comprise a general purpose processor-based system configurable with program code (e.g., including the aforementioned code segments) to provide functionality as described herein. Accordingly, computer system 200 of the illustrated embodiment includes central processing unit (CPU) 201 coupled to system bus 202. CPU 201 may be any general purpose CPU, such as a processor from the PENTIUM or CORE family of processors available from Intel Corporation or a processor from the POWERPC family of processors available from the AIM alliance (Apple Inc., International Business Machines Corporation, and Motorola Inc.). However, the present invention is not restricted by the architecture of CPU 201 as long as CPU 201 supports the inventive operations as described herein.

Bus 202 of the illustrated embodiment is coupled to RAM 203, such as may comprise SRAM, DRAM, SDRAM, flash memory, and/or the like. ROM 204, such as may comprise PROM, EPROM, EEPROM, and/or the like, is also coupled to bus 202 of the illustrated embodiment. RAM 203 and ROM 204 hold user and system data and programs as is well known in the art. Bus 202 is also coupled to input/output (I/O) controller 205, communications adapter 211, user interface adapter 208, and display adapter 209.

I/O controller 205 connects to storage device 206, such as may comprise one or more of a hard disk, an optical disk (e.g., compact disk (CD) or digital versatile disk (DVD)), a floppy disk, and a tape, to the computer system. I/O controller 205 of the illustrated embodiment is also connected to printer 214, which would allow the system to print information such as documents, photographs, etc. Such a printer may be a traditional printer (e.g. dot matrix, laser, etc.), a fax machine, a copy machine, and/or the like.

Communications adapter 211 is adapted to couple computer system 200 to network 212 to provide communications to and/or from external systems, devices, networks, etc. Network 212 may comprise the public switched telephone network (PSTN), a local area network (LAN), a metropolitan area network (MAN), a wide area network (WAN), an extranet, an intranet, the Internet, a cellular network, a cable transmission network, and/or the like.

User interface adapter 208 of the illustrated embodiment couples various user input devices to the computer system. For example, keyboard 213, pointing device 207, and microphone 216 may be coupled through user interface adapter to accept various forms of user input. Similarly, speakers 215 may be coupled through user interface adapter to provide user interface output.

Display adapter 209 provides an interface to display 210. Accordingly, CPU 201 may control display of various information, including text, graphics, and images upon display 210 through display adapter 209. Display 210 may comprise a cathode ray tube (CRT) display, a plasma display, a liquid crystal display (LCD), a projector, and/or the like. Although not expressly shown in the illustrated embodiment, display 210 may provide for input of data as well as output of data. For example, display 210 may comprise a touch screen display according to embodiments of the invention.

Figure 2:
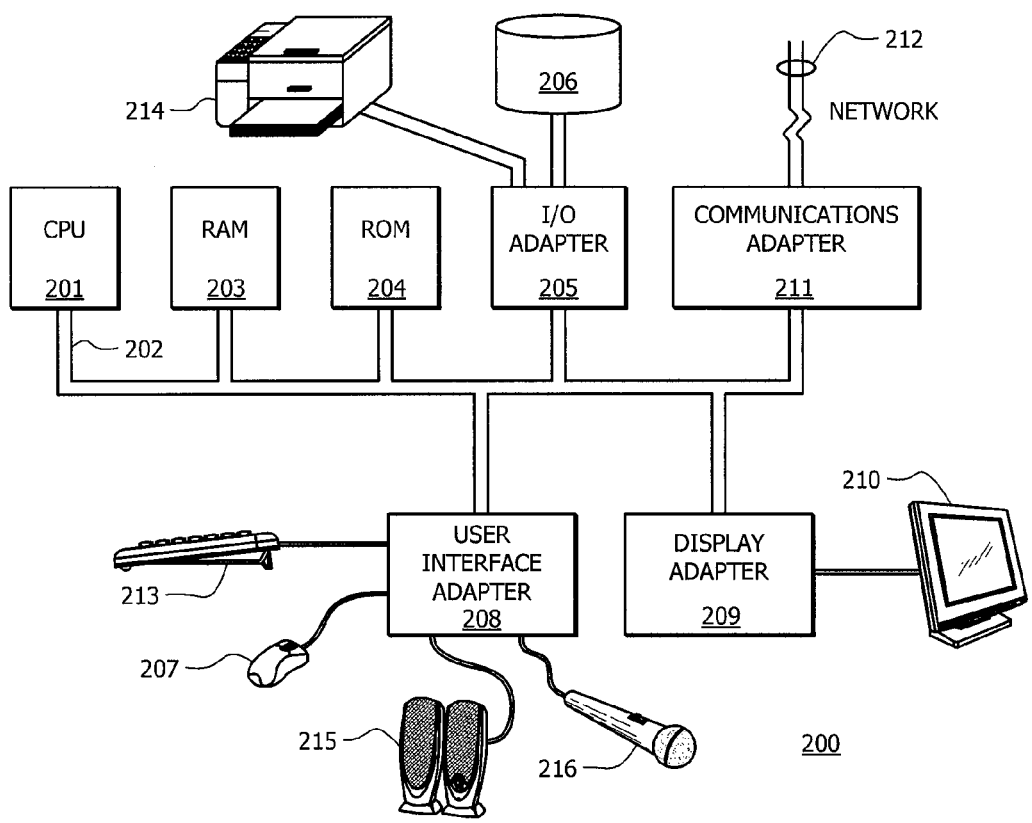
FIG. 2 shows a computer system adaptable to provide functionality of boundary-based depth processing according to embodiments of the present invention.

Although illustrated as a general purpose processor-based system in FIG. 2, it should be appreciated that a processor-based system adapted to provide depth information upsampling logic 130, boundary detection logic 140, and boundary-based interpolation logic 150, or portions thereof, may comprise a special purpose processor-based system, such as may provide hardware logic circuits to implement the foregoing functionality. For example, some or all of the foregoing logic may be implemented in an application specific integrated circuit (ASIC) or field programmable gate array (FPGA) according to embodiments of the invention.

Referring again to FIG. 1, depth information upsampling logic 130 of embodiments operates to provide intermediate upsampling of the depth information. For example, low resolution depth information 110 is upsampled to provide intermediate upsampled depth information 131 according to embodiments. Intermediate upsampled depth information 131 is preferably provided at a resolution corresponding to that of high resolution image information 120. Depth information upsampling logic 130 may implement one or more spatial interpolation algorithm (e.g., nearest neighbor, bilinear, bicubic, etc.), as are well known in the art, to provide upsampling of the low resolution depth information. Although such interpolation techniques are prone to inaccurate results, particularly at object boundaries, due to their use of unreliable samples in the interpolation determinations, operation of the present invention nevertheless provides reliable high resolution depth information through the application of further refinement processing, as described below.

Boundary detection logic 140 of embodiments implements an algorithm to detect object boundaries (e.g., depth discontinuities) within high resolution image 121 to provide boundary information, shown as boundary map 141. These boundaries typically represent areas in which the depth samples of low resolution depth information 110 are inaccurate, and thus in need of refining.

Figure 3:
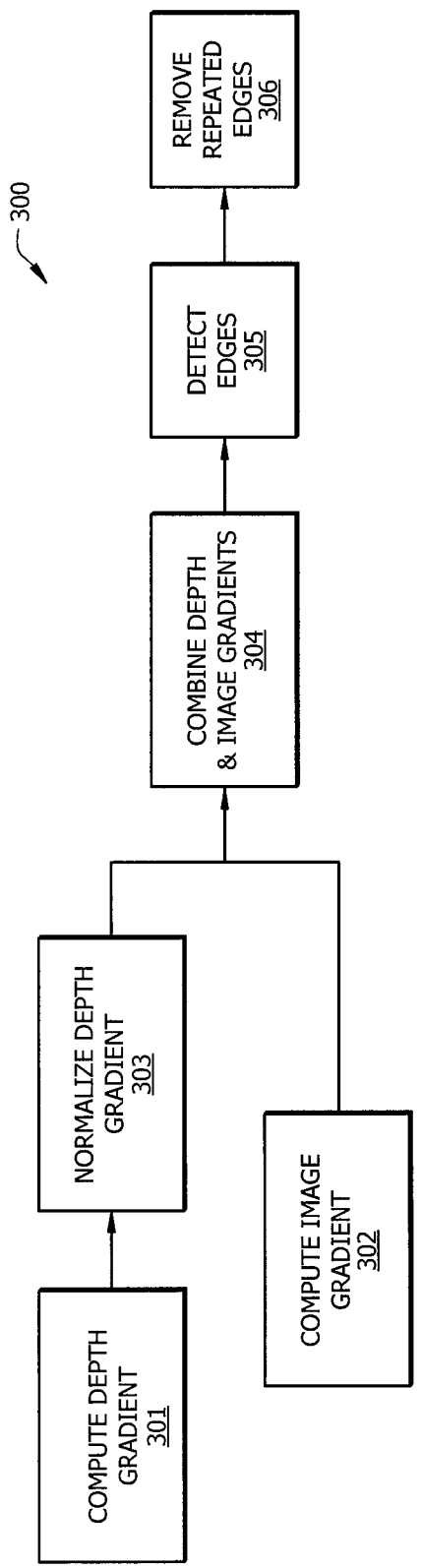
FIG. 3 shows a flow diagram of operation of boundary detection logic providing boundary information according to embodiments of the invention.

FIG. 3 shows a flow diagram of operation of boundary detection logic 140 according to embodiments of the invention providing boundary information as flow 300. At blocks 301 and 302 of the illustrated embodiment the depth and image gradients are computed, respectively. For example, the depth gradient (e.g., the directional change in the depth for each sample in a depth map) for intermediate upsampled depth information 131 may be computed using well known techniques (e.g., using differences between neighboring depths). Similarly, the image gradient (e.g., the directional change in intensity or color for each sample in an image) for high resolution image information 120 may be computed using well known techniques (e.g., using differences between neighboring intensities and/or colors). Embodiments of the invention utilize the Sobel operator, for example, for computing one or more of the foregoing gradients.

Figure 4:
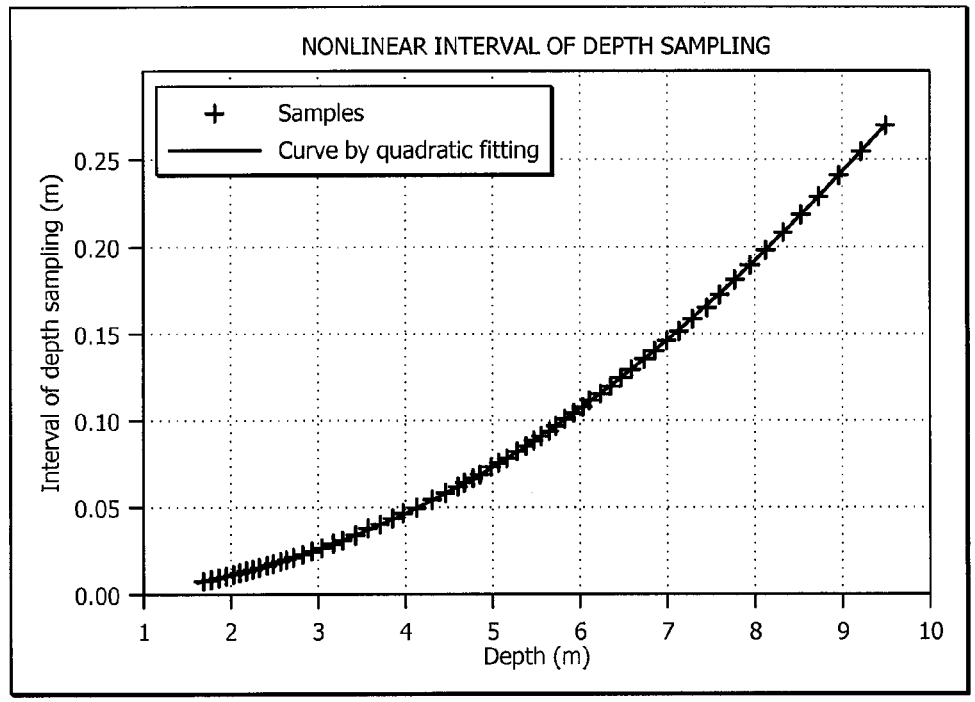
FIG. 4 shows a polynomial curve as may be utilized to fit the statistics of sampling intervals at different depths for normalization according to embodiments of the invention.

At block 303 of the illustrated embodiment, the depth gradient computed at block 301 is normalized. For example, depth sensors often use different sampling intervals at different depths (e.g., to provide weighting with respect to objects more near the viewpoint). Accordingly, processing at block 303 of the illustrated embodiment operates to normalize the depth gradient computed from samples having different sampling intervals. In operation according to embodiments, a polynomial curve, as shown in FIG. 4, may be utilized to fit the statistics of the sampling intervals at different depths. Using such normalization of the depth gradient, the criterion for judging the depth discontinuity based on depth gradient is adapted to the actual depth. That is, detection of boundaries for objects in a scene near the viewpoint and for objects in the scent distant from the view point may be performed equally well using a normalized depth gradient of embodiments herein.

The normalized depth gradient and the image gradient are combined at block 304 of the illustrated embodiment for providing a combined depth and image gradient used in detecting boundaries according to the concepts herein. In combining the normalized depth gradient and image gradient, embodiments may operate to selectively combine gradient information for the combined depth and image gradient. For example, relatively small depth gradients may be removed from the normalized depth gradient and their corresponding image gradients (i.e., depth and image gradients at corresponding positions, such as pixel positions, within the image) may be removed from the image gradient when being combined. Such relatively small depth gradients may, for example, comprise gradients smaller than a particular threshold (e.g., 0.2/1, wherein the gradients are normalized to [0, 1]) after depth gradient normalization. The use of such a fixed threshold for removal of gradients is facilitated according to embodiments by the normalization of the depth gradients. It should be appreciated that relatively large gradients are generally indicative of a boundary, and thus removal of the foregoing small gradients removes information which is not needed for boundary detection.

Additionally or alternatively, in combining the normalized depth gradient and image gradient at block 304 of embodiments, very large depth gradients may be suppressed in order to emphasize the corresponding image gradients. Such relatively large depth gradients may, for example, comprise gradients larger than a threshold (e.g., 0.5/1) after depth gradient normalization. The use of such a fixed threshold for suppression of gradients is facilitated according to embodiments by the normalization of the depth gradients. It should be appreciated that a large depth gradient is generally indicative of a boundary. However, the intermediate upsampled depth information was upsampled from low resolution depth information and thus, although highly indicative of the presence of a boundary, the position information with respect to the boundary may be relatively poor. The high resolution image information, however, is natively high resolution and thus the gradients provided by this information may provide more accurate position information for the boundaries indicated by the very large depth gradients. Accordingly, by suppressing the very large depth gradients and identifying corresponding image gradients as boundaries, operation of the boundary detection logic is able to use these depth gradients to identify the presence of a boundary with high confidence and the image gradients to identify the location of the boundary highly accurately.

Figure 5A:
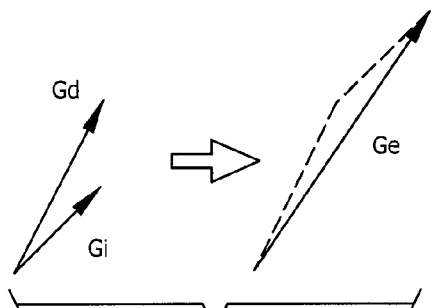
FIGS. 5A and 5B illustrate generation of a combined depth and image gradient from a depth gradient and an image gradient according to embodiments of the invention.
Figure 5B:
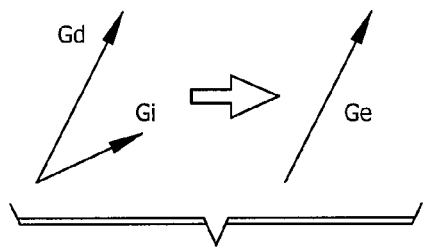

In combining the normalized depth gradient and image gradient at block 304 of embodiments, depth gradients and corresponding image gradients may additionally or alternatively be combined based on direction consistency. It should be appreciated that the coincidence of the directions of both the depth gradient and the image gradient is reliably indicative of a boundary in the image, and thus the combining of these vectors within the combined depth and image gradient facilitates identification of boundaries with high confidence. Accordingly, when the depth gradient and corresponding image gradient have similar directions (e.g., the directions of the gradient vectors are within 20° of each other), the gradients may be combined in the combined depth and image gradient, as shown in FIG. 5A (e.g., the direction of depth gradient vector Gd is within 20° of the direction of image gradient vector Gi and thus the vectors are combined to provide combined depth and image gradient vector Gc). However, the divergence of the directions of the depth gradient and image gradient may be indicative of conflicting information (e.g., resulting from shadows, surface ornamentation, etc. within the image). It should be appreciated that the depth gradient is typically more indicative of the presence of a boundary in such a situation. Accordingly, when the depth gradient and corresponding image gradient do not have similar directions (e.g., the directions of the gradient vectors are greater than 20° of each other), the image gradient may be dropped in favor of the depth gradient in the combined depth and image gradient, as shown in FIG. 5B (e.g., the direction of depth gradient vector Gd is greater than 20° different than the direction of image gradient vector Gi and thus the combined depth and image gradient vector Gc is equivalent to depth gradient vector Gd).

Having provided a combined depth and image gradient at block 304, processing by boundary detection logic 140 according to the illustrated embodiment proceeds to block 305 wherein edges are detected in the combined depth and image gradient. For example, edge detection techniques well known in the art (e.g., non-maximum suppression followed by hysteresis thresholding, as used in the Canny edge detector) may be utilized to identify edges using the combined depth and image gradient.

Flow 300 of the illustrated embodiment does not end the boundary detection operation with detection of edges at block 305, but instead provides further processing to more accurately identify boundaries. Accordingly, the illustrated embodiment proceeds to block 306 for removal of repeated edges within the edges detected at block 305. As discussed above with respect to the combining of the depth gradient and the image gradient to provide a combined depth and image gradient at block 304, some edges may be detected at block 305 based only upon information provided by the depth gradient, while other edges may be detected at block 305 based upon information provided by both the depth gradient and image gradient. Some instances of double edges may be detected where the direction of the depth gradient and image gradient are quite different. Accordingly, processing at block 306 of the illustrated embodiment operates to remove such double edges. For example, directional non-maximum suppression may be performed to remove one of the double edges based on the magnitude and direction of the edges' corresponding combined gradients Gc. Specifically, for each edge pixel, nearby pixels along the direction of its Gc vector (i.e. a line segment centered in the pixel along the direction of its Gc vector) may be examined. If the Gc magnitude of the pixel is larger than that of all its neighboring pixels along its Gc direction, embodiments operate to keep this edge pixel, otherwise this edge pixel will be removed.

Further processing of the detected edges provided at block 306 of embodiments may comprise processing in addition or alternative to the foregoing repeated edge removal. For example, such further processing according to embodiments may include edge connection and cleaning for rendering complete and clean edges. Additionally or alternatively, such further processing may include removing repeated edges by directional non-maximum suppression.

The detected edges as further processed at block 306 of the illustrated embodiment are identified as the depth boundaries within the image. Accordingly, boundary detection logic 140, through operation in accordance with flow 300, provides output boundary map 141, as represented in FIG. 1, according to embodiments of the invention.

Boundary map 141, as provided by boundary detection logic 140 of the illustrated embodiment, is used by boundary-based interpolation logic 150, in combination with low resolution depth information 110 and intermediate upsampled depth information 131, to further refine the depth information and provide high resolution depth information 151. Accordingly, boundary-based interpolation logic of embodiments implements an algorithm to refine intermediate upsampled depth information 131 using boundary map 141. The refinements made with respect to the intermediate upsampled depth information according to embodiments are boundary-based because the boundaries typically represent areas in which the depth samples of the low resolution depth information are inaccurate, and thus in need of refining. In operation according to embodiments, the refinements made are limited to such boundaries to optimize the refined results while minimizing processing resources needed for the processing.

In operation according to embodiments of the invention, boundary-based interpolation logic 150 refines intermediate upsampled depth information 131 based on boundary map 141 using block based interpolation. The block size used preferably depends upon the upsample rate used in generating the intermediate upsampled depth information. For example, the larger the upsample rate, the large the block size. In accordance with embodiments of the invention, each block in the high resolution depth map corresponds to a single depth sample in the original low resolution depth map (e.g., the depth of a block in the high resolution depth map is the depth of the corresponding low resolution sample). Exemplary embodiments are described herein with reference to block sizes of 4 pixels by 4 pixels, although other block sizes may be utilized as desired or appropriate.

In the block based interpolation utilized according to embodiments herein, the blocks are classified into a plurality of categories and different interpolation algorithms may be implemented depending upon the category of the particular block being processed. The categories of blocks implemented by a block based interpolation technique may, for example, include boundary blocks (e.g., blocks that contain boundary pixels) and non-boundary blocks (e.g., blocks that contain no boundary pixels). The non-boundary blocks may be further categorized as unreliable blocks (e.g., blocks who's 8 immediately adjacent neighboring blocks include at least one boundary block and all the 8 neighboring blocks have depths different than the subject block) and reliable blocks (e.g., non-boundary blocks which are not unreliable blocks).

Figure 6:
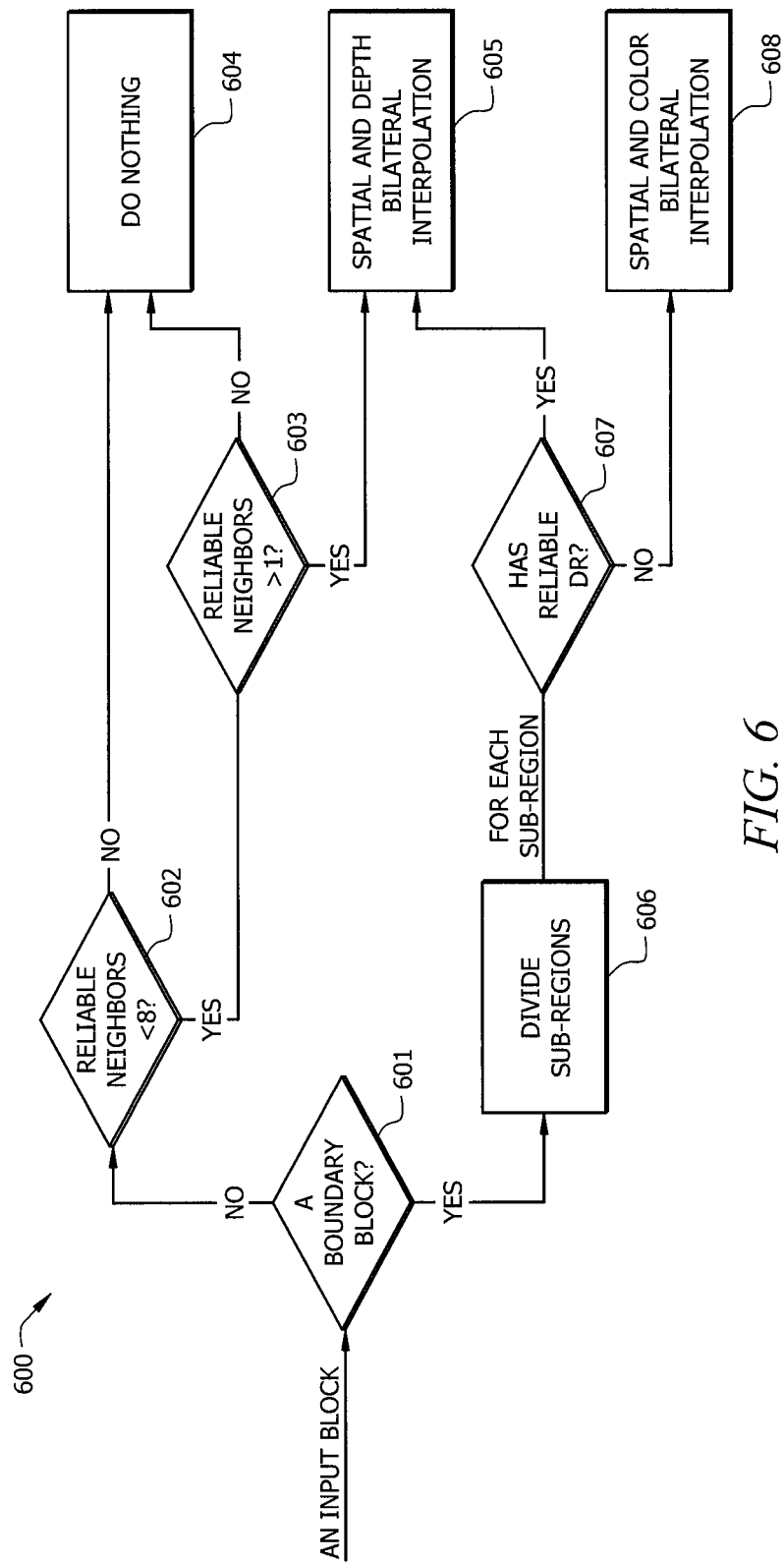
FIG. 6 shows a flow diagram of operation of boundary-based interpolation logic providing high resolution depth information according to embodiments of the invention.

FIG. 6 shows a flow diagram of operation of boundary-based interpolation logic 150 according to embodiments of the invention providing high resolution depth information as flow 600. In operation according to embodiments herein, flow 600 is performed with respect to each block of intermediate upsampled depth information 131 to refine various blocks therein and thereby provide high resolution depth information 151.

At block 601 a determination is made as to whether the subject block is a boundary block or a non-boundary block. For example, boundary-based interpolation logic 150 may utilize boundary map information 141 to determine if the subject block includes one or more pixel identified in the boundary map as being associated with a boundary. If the subject block is determined to be a non-boundary block, processing according to the illustrated embodiment proceeds to block 602.

At block 602 a determination is made as to whether the non-boundary block and all its neighboring blocks are reliable. For example, boundary-based interpolation logic 150 may analyze the 8 immediately adjacent blocks neighboring the subject block (i.e., the 2 blocks above and below, the 2 blocks left and right, and the 4 blocks diagonal to the subject block) to determine if all of those 8 blocks are categorized as reliable (e.g., non-boundary) blocks. If so, the subject block is located distant from the detected object boundary and thus no refinement of pixels of the subject block is performed (block 604). However, if any of the 8 neighboring blocks is categorized as an unreliable (e.g., boundary or unreliable non-boundary) block, processing according to the illustrated embodiment proceeds to block 603.

At block 603 of the illustrated embodiment a determination is made as to whether the neighboring blocks provide reliable enough information for use in interpolative refinement of the pixels of the subject block. For example, boundary-based interpolation logic 150 may analyze the 8 neighboring blocks to determine if more than some threshold number (e.g., more than 1) of neighboring blocks is categorized as reliable non-boundary blocks. If it is determined that the neighboring blocks do not provide reliable enough information for use in interpolative refinement of pixels of the subject block (e.g., the number of reliable non-boundary blocks in the 8 neighboring blocks is less than 2 (<=1)), no refinement of the pixels of the subject block is performed (block 604). That is, because the neighboring blocks are unlikely to provide information more reliable than that of the subject block, the pixels of the subject block are not refined based upon its neighboring blocks. However, if it is determined that the neighboring blocks do provide reliable enough information for use in interpolative refinement of the pixels of the subject block (e.g., the number of reliable non-boundary blocks in the 8 neighboring blocks is greater than 1), processing according to the illustrated embodiment proceeds to block 605.

At block 605 pixels of the subject block are refined using interpolative techniques. For example, the pixels of the subject block may be refined using spatial and depth bilateral interpolation with respect to one or more neighboring block.

In providing the spatial and depth bilateral interpolation at bock 605 of embodiments, it should be appreciated that the subject block (shown as block 700 in FIG. 7) is a non-boundary block where its 8 neighboring blocks (represented by centroids 711-716, 721, and 722 in FIG. 7) are not all reliable blocks (e.g., the blocks represented by centroids 711-716 are reliable while the blocks represented by centroids 721 and 722 are not reliable). That is, the subject block is near depth discontinuity and thus the depth of some of the neighboring blocks may not be reliable for reference. Accordingly, spatial and depth bilateral interpolation is utilized according to embodiments to refine one or more pixel (e.g., pixel 701) of the subject block based upon reliable ones of the neighboring samples. For example, embodiments may perform 3×3 depth and spatial bilateral interpolation for each pixel in the subject block, wherein the 3×3 depth samples are from the subject block (e.g., block 700) and reliable ones of its 8 neighboring blocks (e.g., the blocks represented by centroids 711-716).

Equation (1) below provides a weighted sum of the reliable samples for providing depth and spatial bilateral interpolation for a pixel in the subject block according to embodiments herein, wherein d(p) is the depth of a pixel, p, to be interpolated and p is a 2D vector (x,y).

$$d(p) = \sum_{k \in R} \exp(-|d_k - dr|/\sigma_1) \cdot \exp(-\|p_k - p\|/\sigma_2) \cdot d_k \quad (1)$$

Figure 7:
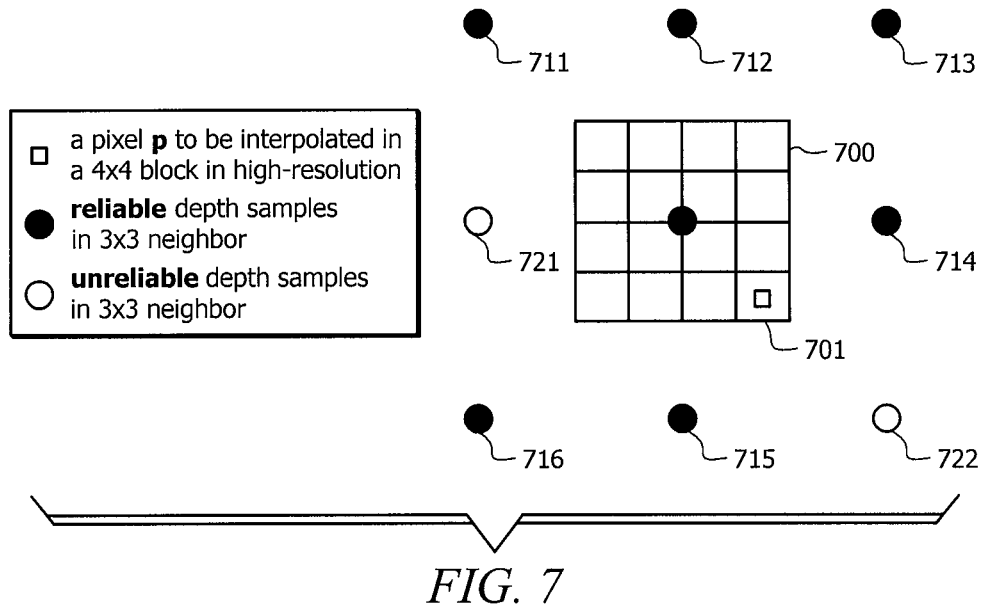
FIG. 7 shows a non-boundary block and representations of its 8 neighboring blocks according to embodiments of the present invention.

As discussed above, R includes only reliable depth samples according to embodiments (e.g., in FIG. 7, R includes block 700 and centroids 711-176). For depth weighting (the first exponential term in equation (1)), all pixels in this block have the same reference depth, dr, that is the median of the reliable depth samples. For spatial weighting (the second exponential term in equation (1)), each pixel has its own reference position, p.

If, at block 601, it was determined that the subject block is a boundary block, processing according to the illustrated embodiment proceeds to block 606. At block 606 the subject block is divided into sub-regions. For example, 4-neighbor selection may be implemented with respect to the boundary pixels in the boundary block to divide the subject block into sub-regions. It should be appreciated that, because the boundary block crosses a depth discontinuity, the block includes different reference depths associated with different objects divided by that depth discontinuity and thus the sub-regions may correspond to the different reference depths (dr) represented by the subject block.

Figure 8A:
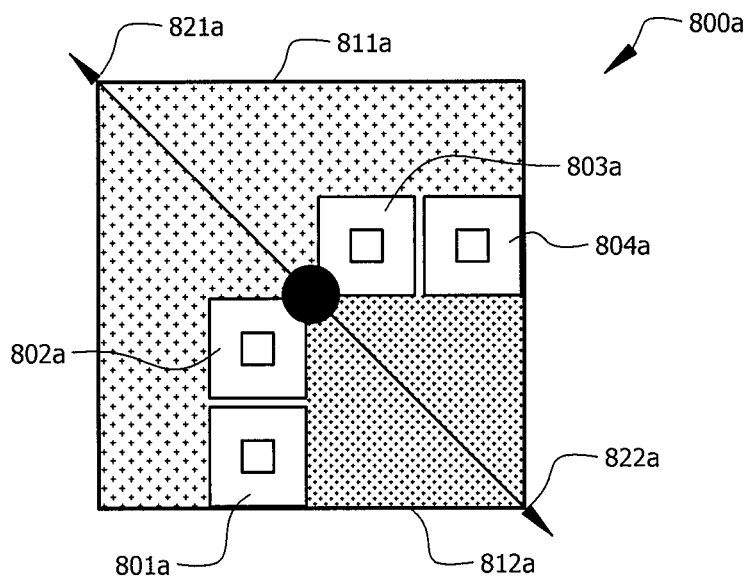
FIGS. 8A and 8B show boundary blocks divided into sub-regions according to embodiments of the present invention.
Figure 8B:
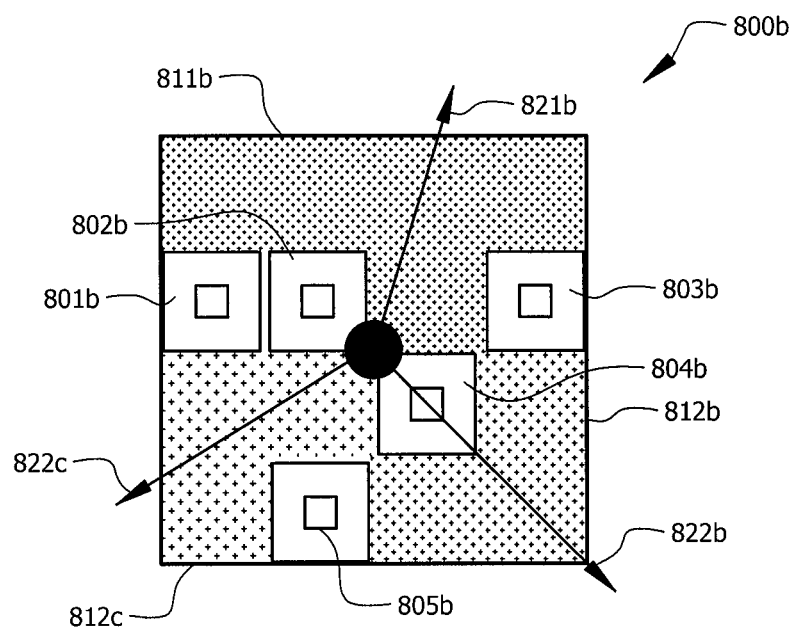

The division of subject blocks into sub-regions according to embodiments herein is illustrated in FIGS. 8A and 8B. For example, boundary block 800a of FIG. 8A is shown divided into sub-regions 811a and 812a divided by boundary pixels 801a-804a. Similarly, boundary block 800b of FIG. 8B is shown divided into sub-regions 811b, 812b, and 813b divided by respective ones of boundary pixels 801b-805b.

Figure 9:
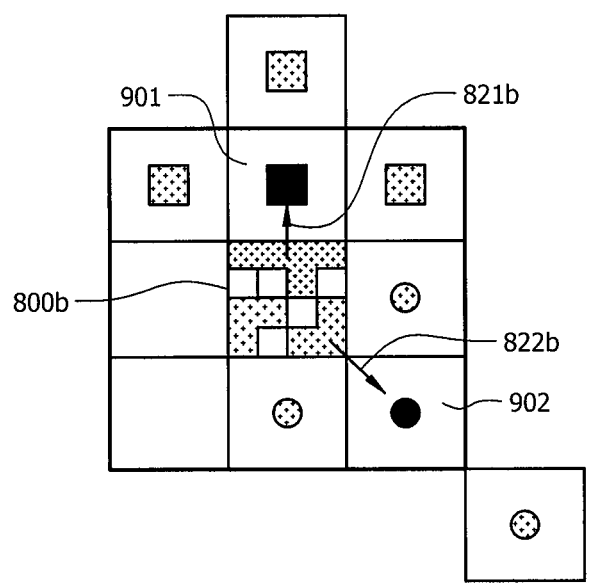
FIG. 9 shows a boundary block and its 8 neighboring blocks according to embodiments of the present invention.

As discussed above, each of the sub-regions may correspond to a different reference depth (e.g., foreground object surface, background object surface, etc.). Accordingly, embodiments of the invention operate to determine a reference depth for each of the sub-regions. For example, in determining the reference depth embodiments of the invention may utilize information regarding the direction from the center of the subject block through the centroid of the respective sub-region (represented by arrows 821a and 822a for sub-regions 811a and 812a, respectively, of FIG. 8A and arrows 821b, 822b, and 823b for sub-regions 811b, 812b, and 813b, respectively, of FIG. 8B) to indicate the sub-region's reference depth, dr, (which is the depth of one of the 8 neighboring blocks) for depth weighting. If the reference depth is not reliable, embodiments of boundary-based interpolation logic 150 operate to identify other candidates of reference depth, such as the gray square blocks adjacent to block 901 and the gray dot blocks adjacent to block 902 shown in FIG. 9, for example.

At block 607 a determination is made as to whether reliable reference depth information is available for the subject sub-region of the boundary block. Depending upon whether the reference depth is determined to be reliable or not, different interpolation techniques may be utilized with respect to the pixels of the sub-region.

If it is determined at block 607 that the subject sub-region has reliable reference depth information, processing according to the illustrated embodiment proceeds to block 605 for interpolation to refine the pixels of the subject sub-region, as described above. For example, it may be quantized into 8 directions corresponding to the 8 neighbors and interpolation techniques applied (e.g., 3×3 depth and spatial bilateral interpolation) for the sub-region to compute a reference depth for that sub-region.

However, if it is determined at block 607 that the subject sub-region does not have reliable reference depth, processing according to the illustrated embodiment proceeds to block 608. At block 608 pixels of the subject sub-region are refined using interpolative techniques. For example, the pixels of the subject sub-region may be refined by spatial and color bilateral interpolation using all depth samples from neighboring blocks. It should be appreciated that block 608 of embodiments may implement such spatial and color bilateral interpolation, rather than the spatial and depth bilateral interpolation of block 605, due to the reference depth dr with respect to the subject sub-region not being reliable for depth weighting in spatial and depth bilateral interpolation.

Having performed interpolation for the boundary blocks and unreliable non-boundary blocks, such as in accordance with flow 600 of FIG. 6, boundary-based interpolation logic 150 of embodiments provides high resolution depth information 151. The boundary-based interpolation implemented according to embodiments utilizes sample data identified as reliable in generating the high resolution depth information, thereby providing robust depth information with a high level of confidence. Moreover, implementation of the interpolation techniques according to embodiments herein is optimized to minimize the computing resources utilized while providing an accurate and reliable depth map.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving low resolution depth information;
   receiving high resolution image information;
   upsampling the low resolution depth information to provide intermediate upsampled depth information having a same resolution as the high resolution image information;
   generating a boundary map from the intermediate upsampled depth information and the high resolution image information; and generating high resolution depth information from the intermediate upsampled depth information using boundary-based interpolation and the boundary map.

2. The method of claim 1, wherein the upsampling the low resolution depth information uses a spatial interpolation algorithm.

3. The method of claim 1, wherein the generating the boundary map comprises:
computing a depth gradient from the intermediate upsampled depth information;
normalizing the depth gradient;
computing an image gradient from the high resolution image information;
generating a combined depth and image gradient from the normalized depth gradient and the image gradient; and
detecting edges using the combined depth and image gradient, wherein one or more of the detected edges are used as boundaries in the boundary map.

4. The method of claim 3, further comprising:
processing the detected edges for identifying the boundaries of the boundary map.

5. The method of claim 4, wherein the processing the detected edges comprises processing selected from the group consisting of:
removing repeated edges by directional non-maximum suppression;
performing edge connection; and
cleaning the detected edges.

6. The method of claim 3, wherein the normalizing the depth gradient comprises:
normalizing the depth gradient for samples having different sampling intervals.

7. The method of claim 3, wherein the generating a combined depth and image gradient comprises:
selectively combining gradient information from the normalized depth gradient and the image gradient to provide the combined depth and image gradient.

8. The method of claim 7, wherein the selectively combining comprises:
removing small depth gradients from the normalized depth gradient and their corresponding image gradients prior to generating the combined depth and image gradient.

9. The method of claim 7, wherein the selectively combining comprises:
suppressing large depth gradients to emphasize their corresponding image gradients in the combined depth and image gradient.

10. The method of claim 7, wherein the selectively combining comprises:
combining depth gradients and corresponding image gradients based on direction consistency between these gradients.

11. The method of claim 1, wherein the generating the high resolution depth information comprises:
using block based analysis of the intermediate upsampled depth information to refine blocks including a portion of a boundary identified in the boundary map and blocks identified as having unreliable depth information.

12. The method of claim 11, wherein the block based analysis comprises:
determining if a subject block is a boundary block using the boundary map.

13. The method of claim 12, wherein if the subject block is determined not to be a boundary block:
determining if the subject block has any immediately adjacent blocks which are boundary blocks or unreliable blocks;
if the subject block is determined not to have any immediately adjacent blocks which are boundary blocks or unreliable blocks, performing no refinement of depth information of the subject block;
if the subject block is determined to have an immediately adjacent block which is a boundary block or unreliable block, performing refinement of depth information of the subject block if two or more of the immediately adjacent blocks are determined to have reliable depth information.

14. The method of claim 13, wherein the performing refinement of the depth information of the subject block comprises:
performing spatial and depth bilateral interpolation using only depth information from reliable neighboring blocks.

15. The method of claim 12, wherein if the subject block is determined to be a boundary block:
dividing the block into sub-regions based upon the boundary, and performing separate refinement of depth information for each sub-region.

16. The method of claim 15, further comprising:
determining if a subject sub-region has reliable reference depth information;
if the subject sub-region is determined to have reliable reference depth information, performing spatial and depth bilateral interpolation using only depth information from reliable neighboring blocks;
if the subject sub-region is determined not to have reliable reference depth information, performing spatial and color bilateral interpolation of depth information of the subject sub-region.

17. A system comprising:
depth information upsampling logic circuitry operable to upsample low resolution depth information to intermediate upsampled depth information;
boundary detection logic circuitry operable to generate a boundary map from the intermediate upsampled depth information using high resolution image information; and
boundary-based interpolation logic circuitry operable to generate high resolution depth information from the intermediate upsampled depth information using the boundary map, wherein a resolution of the high resolution depth information is at least as high as a resolution of the high resolution image information.

18. The system of claim 17, wherein the boundary detection logic circuitry is operable to compute a depth gradient from the intermediate upsampled depth information, normalize the depth gradient, compute an image gradient from the high resolution image information, generate a combined depth and image gradient from the normalized depth gradient and the image gradient, and detect edges using the combined depth and image gradient, wherein one or more of the detected edges are used as boundaries in the boundary map.

19. The system of claim 18, wherein the boundary detection logic circuitry, when operating to generate the combined depth and image gradient, is operable to remove small depth gradients from the normalized depth gradient and their corresponding image gradients prior to generating the combined depth and image gradient.

20. The system of claim 18, wherein the boundary detection logic circuitry, when operating to generate the combined depth and image gradient, is operable to suppress large depth gradients to emphasize their corresponding image gradients in the combined depth and image gradient.

21. The system of claim 18, wherein the boundary detection logic circuitry, when operating to generate the combined depth and image gradient, is operable to combine depth gradients and corresponding image gradients based on direction consistency between these gradients.

22. The system of claim 17, wherein the boundary-based interpolation logic circuitry is operable to selectively apply spatial and depth bilateral interpolation and spatial and color bilateral interpolation with respect to blocks within the intermediate upsampled depth information determined to be boundary blocks, wherein the boundary blocks are blocks that include a portion of a boundary identified in the boundary map.

23. The system of claim 17, wherein the boundary-based interpolation logic circuitry is operable to selectively apply spatial and depth bilateral interpolation and no interpolation with respect to blocks within the intermediate upsampled depth information determined to be non-boundary blocks, wherein the non-boundary blocks are blocks that do not include any portion of a boundary identified in the boundary map.

24. A method comprising:
upsampling low resolution depth information to provide intermediate upsampled depth information;
generating a boundary map from the intermediate upsampled depth information and high resolution image information, wherein the generating the boundary map comprises:
computing a depth gradient from the intermediate upsampled depth information;
normalizing the depth gradient;
computing an image gradient from the high resolution image information;
generating a combined depth and image gradient from the normalized depth gradient and the image gradient; and
detecting edges using the combined depth and image gradient, wherein one or more of the detected edges are used as boundaries in the boundary map; and
generating high resolution depth information from the intermediate upsampled depth information using boundary-based interpolation and the boundary map, wherein the generating the high resolution depth information comprises:
determining if a subject block of the intermediate upsampled depth information is a boundary block, wherein a boundary block includes a portion of a boundary identified in the boundary map;
if the subject block is determined not to be a boundary block, determining if blocks immediately adjacent to the subject block have reliable depth information; and
applying different refinement techniques to pixels of the subject block depending upon whether the subject block is a boundary block and whether the blocks neighboring the subject block are reliable.

25. The method of claim 24, wherein the applying different refinement techniques comprises:
applying a refinement technique to the pixels of the subject block only if the subject block is either a boundary block or a non-boundary block having more than one but less than eight immediately adjacent neighboring blocks with reliable depth information.

26. The method of claim 24, wherein the applying different refinement techniques comprises:
if the subject block is determined to be a boundary block, selectively applying spatial and depth bilateral interpolation and spatial and color bilateral interpolation with respect to sub-regions of the subject block.

27. The method of claim 26, wherein the applying different refinement techniques further comprises:
if the subject block is determined to be a non-boundary block, selectively applying spatial and depth bilateral interpolation and no interpolation with respect to the subject block.

28. The method of claim 24, wherein the normalizing the depth gradient comprises:
normalizing the depth gradient for samples having different sampling intervals.

29. The method of claim 24, wherein the generating a combined depth and image gradient comprises:
selectively combining gradient information from the normalized depth gradient and the image gradient to provide the combined depth and image gradient.

* * * * *